Figure 1:
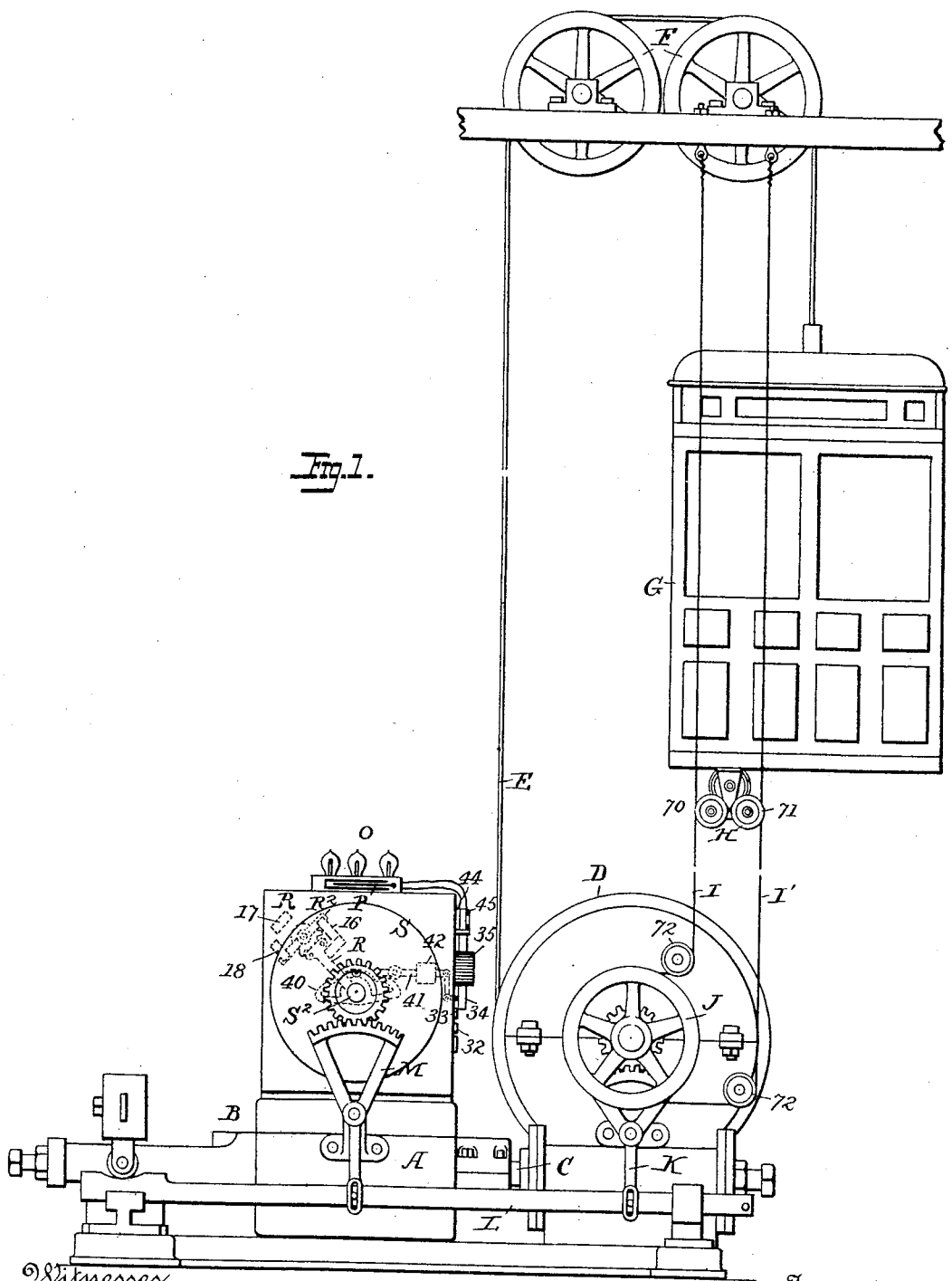

(No Model.)  3 Sheets—Sheet 1.

R. C. SMITH.
CONTROLLING MECHANISM FOR ELECTRIC MOTORS.

No. 562,745.  Patented June 23, 1896.

Witnesses
Jno G Hinkel
Alex N. Dobson

Inventor
Rudolph C. Smith
by Foster Freeman
Attorneys

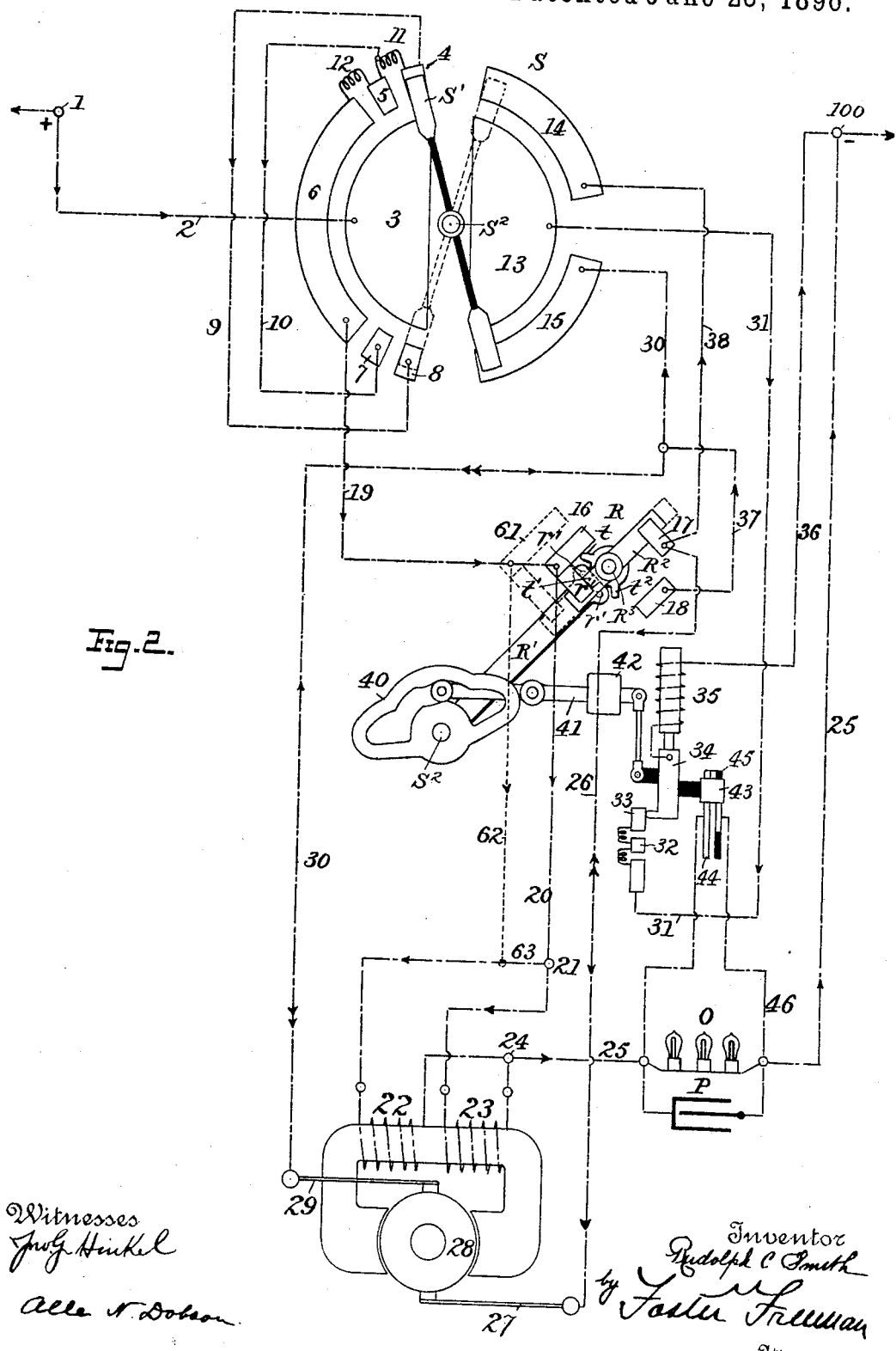

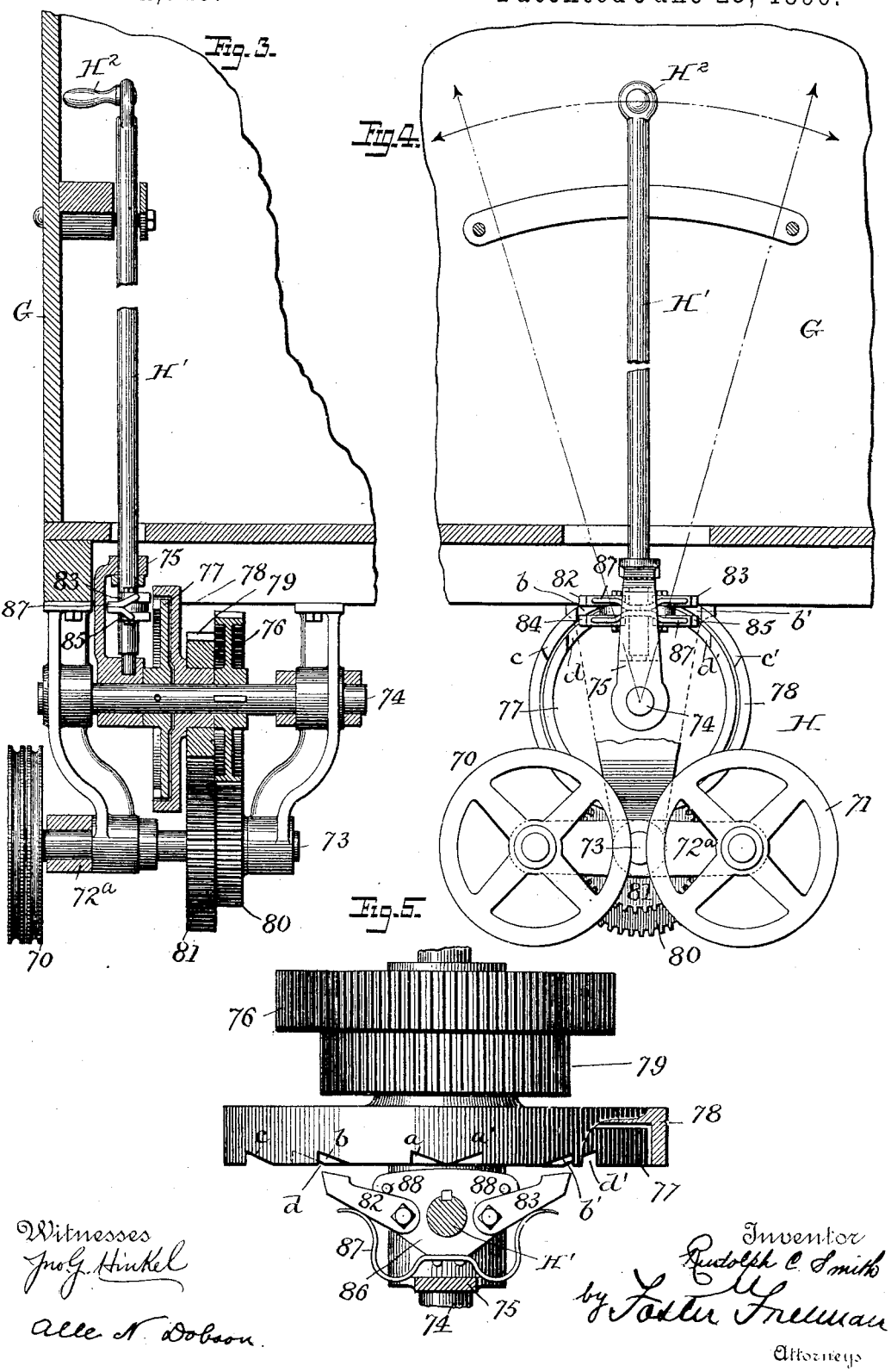

UNITED STATES PATENT OFFICE.

RUDOLPH C. SMITH, OF YONKERS, NEW YORK, ASSIGNOR, BY MESNE ASSIGNMENTS, TO THE NATIONAL COMPANY, OF CHICAGO, ILLINOIS.

CONTROLLING MECHANISM FOR ELECTRIC MOTORS.

SPECIFICATION forming part of Letters Patent No. 562,745, dated June 23, 1896.

Application filed January 25, 1892. Serial No. 419,201. (No model.)

*To all whom it may concern:*

Be it known that I, RUDOLPH C. SMITH, a citizen of the United States, residing in Yonkers, Westchester county, State of New York, have invented certain new and useful Improvements in Controlling Mechanism for Electric Motors, of which the following is a specification.

My invention relates to controlling mechanism for electric motors and means for operating the same, and while it is applicable to electric motors when used for many and various purposes, and my invention includes such uses, it is designed more especially for use in connection with elevators which are operated by electric motors.

My invention has primarily for its object to overcome the objections and difficulties arising from the effect of what is known as the "extra current" which occurs on making and breaking the circuit, and more especially in breaking the field-magnet circuit of the motor.

It has further for its object to improve the construction and arrangements of the operating devices and connections, whereby not only the objections before noted are overcome, but the motor and the devices operated thereby may be readily and thoroughly controlled.

My invention consists in the various features of construction, arrangement, and operation of devices, substantially such as are hereinafter more particularly pointed out, and while I have disclosed and described devices which I have found practicable in carrying out my invention, it will be understood that I do not limit myself to the precise construction, arrangement, or mode of operation set forth, as all of these may be varied by those skilled in the art to suit the various conditions under which the invention is to be applied.

Referring to the accompanying drawings, Figure 1 is an elevation showing an electric motor connected to operate an elevator and having the various features of my invention embodied therein. Fig. 2 is a diagrammatic representation of the circuits and connections by means of which the motor is controlled and the effects hereinafter pointed out produced. Fig. 3 is an enlarged sectional view showing the preferred arrangement of devices for operating the switch and controlling the circuits of the motor. Fig. 4 is a side view, parts being broken away to more clearly show the arrangement of the devices. Fig. 5 is a plan view of the controlling device.

In operating electric motors it is well known that in starting and stopping the motors, especially if they are wound in shunt, and where the field-magnet coils consist of a considerable number of turns arranged in series, the effect of the extra current has proven objectionable for many obvious reasons, and this is especially so where the electric motors are used for operating elevators which have to be started and stopped many times in their usual course of operation. This objectionable feature of course is more especially noticeable and causes a more severe strain on the motor and its connections when the circuit of the motor is broken than when the circuit is closed, and it is found that not only does this extra current endanger the electric motor itself, being liable to injure the insulation and produce other derangements, but all the electrical apparatus connected to the motor for controlling it are liable to injury as well. This objection can be obviated to a greater or less extent in various ways, and I have embodied in the present application several means, all of which have a greater or less tendency to overcome the objections stated, and which may be used together in one complete apparatus, as illustrated, or may be used separately or in connection with other features of construction and arrangement, and which will operate to weaken the extra current to such a degree that all danger is avoided.

It is also well known that in starting a motor from a state of rest, it is desirable and practically necessary to control the current passing through the armature of the motor, and to admit it gradually thereto, so as to prevent burning or other effects on the circuits of the motor, so that the motor will have time to generate a counter electromotive force to oppose the full current necessary to operate it under normal conditions. A further objection to admitting the full force of the current to a motor which is stationary, especially when it is connected to a distributing-circuit having other translating devices fed from the same generator, arises from the fact that the opening of a new path for the current in which there is comparatively little resistance, causes a fall in pressure on the main wires, which expresses itself in a flicker of the lamps, for instance, or a variation in the operation of other translating devices. In order to avoid this objection, I arrange the controlling devices so that the operator must necessarily introduce a certain amount of resistance in the circuit when the motor is first connected, and then give the motor time to start and generate a degree of counter electromotive force before the circuit is connected, in such a manner as to allow the full current to flow through the motor. This feature I accomplish by so arranging the controlling devices that the switch controlling the circuit of the motor will pause in its movement from a position of no current to a position of full current, substantially in a manner hereinafter more particularly pointed out.

In the drawings, A represents an electric motor, the armature B of which is mounted on a shaft C, which is connected to the drum D, around which the main ropes E are wound, they passing over suitable sheaves F, and being connected to the car G. Arranged in some suitable position, as upon the motor A, is a switch device S, by means of which the current passing through the motor is controlled. This switch is controlled from the car by the switch-controlling device H, which operates on the suspensory-ropes I I', which in turn operate in the present instance a wheel J, which is geared to a segmental lever K, connected to a sliding rod L, and this rod, by means of segmental lever M, operates the switch S. I have shown herein a conventional and well-known type of electric motor and switch-operating means, although of course it is understood that any other form or arrangement of devices may be used, the means H for controlling the switch being more fully illustrated in other figures to be hereinafter more specifically described.

Referring more particularly to the diagrammatic arrangement shown in Fig. 2, the means for obviating the effects of the extra current will be more clearly understood, and in this figure, 1 represents the plus binding-post, and 100 the minus binding-post, to which posts the mains or leading wires of the system of electrical distribution are connected.

One of the features of the invention is to so arrange the connections of the motor as to avoid as much as possible the evil effects due to the extra current, and to accomplish this I so arrange the switch and its connections that a certain amount of resistance is at first included in the circuit when the current is admitted to the field-magnets, and when the circuit is disconnected from the field-magnets there is also a considerable resistance in the circuit, so that when the actual break comes there will be the smallest amount of discharge or extra current to affect the connections and devices. I thus arrange the switch so that all the current going to the motor in the first instance passes through a series of resistances before it divides into the field and armature circuits. After the current is divided it passes through the field and armature circuits, and in order that the proper proportion of the current shall pass through the field-magnet coils I normally include in the armature-circuit, at starting, a resistance which is eventually cut out as the motor attains its normal speed.

From the binding-post is a conductor 2, leading to the plate 3 of the switch S. The switch is provided with a switch-arm S', mounted on a shaft $S^2$, and adapted to be operated by the switch-controlling devices from the cage or otherwise, so as to move to the right or the left over the plates of the switch, but when in its normal position the arm is free from any of the contact-plates of the switch, so that no current will pass through. Arranged around the periphery of the plates 3 are contact-plates 4, 5, 6, 7, and 8. The plates 4 and 8 are connected by a conductor 9, plates 5 and 7 are connected in like manner by conductor 10, while between the plates 4 and 5 and 5 and 6 are resistance devices 11 and 12, respectively. Of course it will be understood that while I have shown two resistance devices in the switch between three plates, there may be in actual practice a much larger number, these being shown as sufficient to explain the principles of my invention. On the other side of the switch is a sector-plate 13, and around the periphery of this plate are arranged the segmental plates 14 and 15.

It is well understood that in order to reverse the direction of rotation of the motor the current must be reversed in either the field or the armature, and in the present instance I have shown the devices arranged to maintain the current through the field-magnet coils in a constant direction, while the current in the armature-circuit can be reversed, and for this purpose I provide an additional or auxiliary switch R. This switch R is operated from the shaft $S^2$ by means of an arm R', which is arranged in some suitable way to move the switch-plate $R^2$ to make the proper connections, and this is preferably of a type known as a "snap-switch." This switch includes a contact-plate 16 on one side and two contact-plates 17 and 18 on the other side, and the arm $R^2$, mounted on a stud $R^3$, is arranged to vibrate so as to connect the plates 16 and 17 or 16 and 18, as the case may be. It is also desirable that this switch R shall operate before or immediately at the moment the switch-arm S' of the switch S makes contact with any of the contact-plates thereof, and to do this I provide the arm R' with a notch $r$, having preferably at either side thereof two rollers $r'$, and on the shaft or bearing of the switch-bar $R^2$ are in the present instance three teeth $t\ t'\ t^2$, and in the normal position the tooth $t'$ rests in the notch $r$ and no current passes through the circuits. When, however, the shaft $S^2$ is moved, owing to the length of the arm $R'$, the switch-bar $R^2$ is immediately moved to make contact between 16 and 17 or 16 and 18, depending upon the direction of rotation of the shaft $S^2$. As soon as this is accomplished the arm $R'$ moves free from the teeth and the bar remains in position until the shaft is returned to its normal position, when one of the rollers $r'$, for instance, will impinge upon one of the teeth, as $t$, and move the switch-arm $R^2$ to its normal position, where it will be held by the tooth $t'$ extending into the notch $r$. It will be understood, of course, if the switch-arm moves in the opposite direction the same operations will be carried out, except in the reverse direction, but in all instances a slight movement of the shaft $S^2$ will operate the switch R to close the circuit just before or as soon as the switch-arm $S'$ impinges upon any of the contacts of the switch S, and, on the contrary, the switch-bar $R^2$ is operated just after or at the moment the switch-arm $S'$ leaves its contact to assume its normal position.

The contact-plate 6 of the switch S is connected by conductor 19 to the contact 16 of the switch-arm, and leading from this contact 16 is a conductor 20, which in the present instance divides at the point 21 and includes the coils 22 23 of the field-magnet in multiple arc, and coming together again at the point 24 passes by the conductor 25 to the minus binding-post 100.

Connected to the plate 17 of the switch R is a conductor 26, leading to the brush 27, through the armature 28, and out by the brush 29, through the conductor 30, to the plate 15 of the switch S. The plate 13 of the switch S is connected to a conductor 31, to a resistance device 32 33, from whence it passes by means of the brush 34 and the solenoid 35 by the conductor 36 to the minus binding-post.

The contact-plate 18 of the switch R is connected to a conductor 37, which in turn is connected to the conductor 30, and the contact-plate 17 is further connected by a conductor 38 to the plate 14 of the switch S.

Mounted on the shaft $S^2$ of the switch S, or in any other part connected therewith, is a cam 40, and this cam controls the lever 41, having the weight 42 connected to the brush 34, being insulated therefrom. The cam is so arranged that when the switch-arm $S'$ is first moved to one side or the other the lever 41 will be positively moved a short distance, not sufficient to cut out the resistance 33, but enough to carry the contact-piece 43 downward to close the circuit between the terminals 44 45 of the shunt 46. It will be seen that one of these terminals, as 44, is of conducting material throughout, while the terminal 45 is provided with insulating portions at either end, and normally, in a state of rest of the switch, the contact-plate 43 bears on the terminal 44 and on an insulated portion of the terminal 45 and the short circuit 46 is open, including the resistance O, which is in the form of lamps or other noninductive resistance in the field-magnet circuit 25. When, however, the cam 40 is moved farther, the lever 41 is free to move under the weight 42, so as to cut out the resistance 33, unless the current through the solenoid 35 is of such a character as to prevent the weight operating, and it will thus be seen that after the cam has moved a certain distance, the brush 34, controlling the resistance 32 33, is electrically controlled by the solenoid 35, acting in opposition to the weight 42. When, however, the switch has returned to its normal position, and just before it reaches that position, the lever 41 is positively operated, so that the resistance 32 33 is positively included in the armature-circuit, and the short circuit of the resistance O is positively broken, so that said resistance will be positively included in the field-magnet circuit just before the switch is fully opened.

As above intimated, after the switch has moved a certain distance, the brush 34 is free to move under the influence of the current from the armature, and when the machine operates normally, the weight 42 will overcome the attractive force of the solenoid and the brush will move to cut out the resistance 33 32 from the armature-circuit, and in doing this the contact-piece will move over the contacts 44 45, and it will be seen that when said brush is in the elevated position the short circuit 46 is opened, but as the brush moves downward it closes the short circuit, removing the resistance device from the field-magnet circuit. When the brush 43 reaches it lowermost position, the short circuit is again broken and the resistance included in the field-magnet coils, and this is the position of the parts when the motor is running under its normal speed with a full load; that is, the resistance is cut out of the armature-circuit and included in the field-magnet circuit.

In order to further overcome the effects of the extra current, I provide a condenser P, which I place in a shunt around the resistance O, and this, as is well known, provided the relative proportions of the condenser-surface and resistance are maintained, will tend to obliterate the extra current or prevent its causing injury to the parts. Another arrangement having the same tendency consists in providing the switch R with an extra contact 61, and connecting therewith a conductor 62, which is connected to one of the field-magnet coils, as 22, while the conductor 20, connected to the plate 16, feeds the coil 23 of the field-magnet, the portion of the conductor 63 between 20 and 62 of course being removed or disconnected. The contact 61 is so arranged that when the switch-bar R² is moved it will make contact with 17 and 16 simultaneously, but has to be moved slightly farther to complete the contact with 61, and, on the contrary, when the switch-bar is moved to break the circuit, it first breaks circuit with 61, and then with 16 and 17. This will result in connecting and disconnecting the field-magnet sections in the circuit, one after the other, and the intensity of the extra current will consequently be reduced. In order to further lessen the extra current, and at the same time insure the slow admission of the full current to the motor to prevent any drop in the main circuit of the generator, I arrange the controlling device on the car in such a way that when it is operated to move the switch the operation has to be gradual, and is preferably made in installments, so to speak, that is to say, that the lever has to be operated more than once to so move the switch as to connect the motor to the main circuit without resistance. The same is true when the motor is disconnected from the line; that is, the lever may be adjusted so that it will take two motions to cut out the motor-circuit, the first motion introducing a certain amount of resistance and the next motion introducing a certain more resistance and then cutting out the circuit entirely. While this may be accomplished with various devices, I have illustrated herein a construction of controlling device which can be applied to the car and which may be operated in various ways; that is to say, it may be adjusted so that a single movement of the lever will allow the full current to flow to the motor, or two or more movements may be required to accomplish this result, and, in a like manner, the motor may be cut out by means of one or two movements of the lever, depending upon the adjustment of the parts.

As shown in Fig. 1, the standing ropes I I' pass over the sheaves 70 71 and around them, so as to practically form loops in the standing ropes. Thence they pass around the guide-pulleys 72 and around the pulley J, which is connected to operate the switch. The lever H', which extends into the car, is connected by means of gears, so as to move the sheaves 70 71 in a way to take up more or less of one or the other of the standing ropes I I' and cause the pulley J to rotate in one direction or the other. While various means may be used for this purpose, I have shown the sheaves 70 71 as mounted on a cross-piece 72ª, which is rigidly mounted on the shaft 73, supported by suitable hangers; also supported by the same hangers is a shaft 74. The handle H' is supported in a bracket or hanger 75, which is loosely mounted on the shaft 74, the handle being capable of turning in said bracket. Mounted on the shaft 74, and secured thereto, is a pinion 76 and a ratchet-wheel 77, while loosely mounted on the shaft is a ratchet-wheel 78, carrying a pinion 79, keyed thereto. These pinions 76 and 79 engage, respectively, with pinions 80 81, fixed on the shaft 73, they being of different sizes, so that the said shaft may be driven at different speeds, as hereinafter set forth. Mounted on the handle H' are two sets of pawls, each set consisting of two pawls, as 82 83 and 84 85, which are pivoted to a plate or bearing-head 86, secured to the handle H', and are normally under the stress of springs 87, which hold the pawls against stops 88. The ratchet-wheel 78 has a series of notches $a\ a'$, $b\ b'$, and $c\ c'$ in its periphery, they being oppositely arranged, as indicated, while the ratchet-wheel 77 has two notches only, as $d\ d'$.

The parts are shown in their normal position when the switch S would be open, and if it is desired to start the motor the operator grasps the handpiece H² on the handle H' and presses it to the right or left. This has a tendency to turn the handle H' on its axis and to cause one of the pawls, as 82, to engage the notch $b$ on the ratchet-wheel 78. When the handle is thrown over to the limit of its motion, as indicated by the arrow-lines in Fig. 4, the ratchet-wheel 78 is turned, so as to move the sheaves 70 71, through the medium of the gear 79 81, to move the switch-arm S a certain distance. The rod H' is then brought back to its normal position and again forced forward, when the pawl 82 will take into the notch $a$ in the ratchet-wheel and still further move the switch, and in the present instance the parts are arranged so that this operation will move the switch-arm S' to apply the full current to the motor, and the motor operates until it is desired to stop. The operator on the car then reverses the handle H', when the pawl 83 will engage the notch $c'$ and move the switch backward a certain degree, and then at the next movement of the rod H' the pawl 83 will engage the notch $b'$ and restore the ratchet-wheel 78 to its normal position and the switch-arm to its neutral position, cutting out the circuit.

It will thus be seen that the circuit of the motor is cut in and out by steps; that is, the hand lever or rod of the controlling device has to be moved forward twice at least to cut in the motor-circuit, and twice to cut it out, giving a certain time or retardation to the movement of the switch-arm S'. Sometimes, however, it is desirable to cut out the switch quickly, and in this case the second pawl engages with the inner ratchet-wheel 77, as, for instance, the pawl 85 will engage with the notch $d$ in the inner or fast ratchet-wheel, and this through the gear connections described will throw the switch off with one movement of the hand-lever. With this arrangement of devices it will be seen that the ratchet-wheels 78 and 77 can be adjusted in such relation to each other on their respective supports that their respective pawls will engage the notches in the ratchet-wheels under various conditions, so that it will require one motion to throw the whole current into the motor, and two motions to throw it out, or vice versa, two motions to throw it in, or one motion to throw it out, or one motion to do both, or two motions to do both, as the requirements of any particular case may indicate.

In order that the arrangement of circuits shown in Fig. 2 may be clearly understood, we will trace the circuits under varying conditions, and in the drawings the parts are shown in position with the switch-arm S' moved to the left, so as to complete the connections between the plates 3 and 4 and the plates 13 and 15, and this of course has moved the cam 40, so as to cause the contact-piece 43 to close the short circuit 46, and the switch-bar R² has been moved to the position shown, and the current coming from the binding-post 1 passes to the sector-plate 3, thence to the contact-plate 4, through the resistances 11 12 to the plate 6, and by the wire 19 to the contact 16, and 61 if both are used. Here the current divides, passing by the conductor 20 and 62 when used, through the coils 22 and 23 of the field-magnet, and out at the point 24 by the conductor 25 through the resistance O to minus binding-post 100. The armature-circuit from the contact 16 passes through the switch-bar R² to the contact 17, thence by the wire 26 in the direction of the single arrow through the brush 27, the armature-coils 28, brush 29, conductor 30 to the plate 15, thence to the plate 13, and by the conductor 31 to the resistance 32 33, then to the brush 34, solenoid 35, and line 36 to the minus binding-post. It will be seen that under these conditions the resistances 11 and 12 are included in the circuit of both the field and armature circuits, while the resistance 32 33 is in the armature-circuit, and the resistance O in the field-magnet circuit is short-circuited. A further movement of the hand-lever H will cause the switch-arm S' to bear upon the contact 6, when the current will pass, substantially as before described, through the field, and the cam 40 will be moved to a position which will allow the weight 42 to operate, and cut out the resistance 32 33 as soon as the motor produces sufficient counter electromotive force to reduce the attractive power of the solenoid 35 to allow the weight to overcome such force. This will cause the contact 43 to pass on to the lower portion of the contact-bar 45, and break the short circuit, putting the resistance O into the field-magnet circuit.

When the motor is to be stopped, a reverse operation is to be gone through, and the first movement of the hand-lever of the controlling device will restore the switch-arm S to the position shown, and leave the circuits as previously set forth, while the second movement will break the circuit. The moment this is accomplished it will be seen that the resistance O is included in the field-magnet circuit, the resistance 32 33 is in the armature-circuit, and the resistances 11 and 12 are in both circuits, and all these will tend to prevent injurious effects of the extra current. Furthermore, by using a double switch R, the circuit through one of the field-magnet coils will be broken just before the circuit of the other coil is broken, and this will further tend to reduce the extra current.

Of course it will be understood that when the hand-lever is turned in the opposite direction the switch S' will perform the same functions, except the directions of the current through the armature-coils will be changed by the movement of the switch R, while the direction of the current through the field remains constant. It will be observed that moving the switch-arm S' from one side or the other does not alone reverse the direction of the current, while moving the switch-arm R² of the switch R makes the proper connection whereby the switch S can reverse the armature-circuit. The additional safety-resistances 32 33 in the armature-circuit prevents excess of current passing through the armature at the moment of starting, and insures the proper excitation of the field-coils, and is automatically cut out when the motor is running at normal speed. The resistance O not only affects the extra current, but when the motor is running at proper speed includes a resistance in the field-magnet circuit to compensate for the extra amount of current which might flow through the coils when in multiple arc, and this preserves the proper balance of the current in the field and armature under normal conditions of running.

What I claim is—

1. The combination with a shunt-wound motor, of a reversing-switch, a combined field and armature circuit leading from said switch, resistances controlled by the switch and arranged to be included and excluded in the combined field and armature circuit, and an auxiliary switch coöperating with the reversing-switch to change the direction of the current in the armature-circuit, substantially as described.

2. The combination with a shunt-wound motor, of a reversing-switch having resistances, a combined field and armature circuit leading from said switch, an auxiliary switch, connections from the auxiliary switch to the field-magnet coils, and connections from the auxiliary switch including the reversing-switch for controlling the direction of the current through the armature-circuit, substantially as described.

3. The combination with a shunt-motor, of a reversing-switch, an auxiliary switch coöperating with the reversing-switch for changing the direction of the current in the armature-circuit, a safety-resistance in the armature-circuit and connections between the safety-resistance and reversing-switch, substantially as described.

4. The combination with a shunt-motor, of a reversing-switch having a series of resistances, an auxiliary switch, a safety-resistance in the armature-circuit, a shaft, and connections between the shaft and each of these switches, and the resistance, whereby all are controlled by said shaft, substantially as described.

5. The combination with a shunt-wound motor, of a reversing-switch, an auxiliary switch, a safety-resistance in the armature-circuit, and a resistance in the field-magnet circuit, substantially as described.

6. The combination with a shunt-wound motor, of a reversing-switch having a resistance arranged to be included and excluded in both the field and armature circuit, an auxiliary switch coöperating with the reversing-switch for changing the direction of the current in the armature, a safety-resistance in the armature-circuit, and a resistance in the field-magnet circuit, substantially as described.

7. The combination with a shunt-wound motor and a reversing-switch, of a non-inductive resistance in the field-magnet circuit, and a shunt, including a condenser, around said resistance, substantially as described.

8. The combination with a shunt-motor, having the field-magnet coils wound in sections, of a non-inductive compensating resistance included in said field-magnet circuit, substantially as described.

9. The combination with a shunt-motor, the field-magnets of which are wound in sections, of a compensating non-inductive resistance included in the field-magnet circuit, and a shunt around said resistance including a condenser, substantially as described.

10. The combination with a shunt-wound motor, the field-magnets of which are wound in sections, of a compensating non-inductive resistance included in the field, and a short circuit for said resistance and means for opening and closing said short circuit, substantially as described.

11. The combination with a shunt-wound motor, the field-coils of which are wound in sections, of a compensating resistance in the field-magnet circuit, a short circuit therefor and means controlling said short circuit, the arrangement being such that when the motor is started, the short circuit is open, and as it attains a greater speed it is closed, and when it attains its normal speed it is again opened, substantially as described.

12. The combination with a shunt-wound motor, of a resistance in the field-magnet circuit thereof, a short circuit for said resistance, a safety-resistance in the armature-circuit, and means for controlling said safety-resistance and short circuit, the arrangement being such that when the resistance is cut out of the armature-circuit the short circuit of the field-magnet resistance is open, substantially as described.

13. The combination with a shunt-wound motor, of the field-magnet circuit including a resistance, a short circuit for said resistance, a safety-resistance in the armature-circuit, and a solenoid in the armature-circuit controlling said safety-resistance and the short circuit of the field-magnet resistance, substantially as described.

14. The combination with a shunt-wound motor, of a reversing-switch controlling the direction of the current throught the armature, a safety-resistance in the armature-circuit, a resistance in the field-magnet circuit, and a condenser in a shunt around said field-magnet resistance, substantially as described.

15. The combination with a shunt-wound motor, of a reversing-switch controlling the direction of the current through said motor, a safety-resistance in the armature-circuit of said motor, a resistance in the field-magnet circuit, a shunt around said field-magnet circuit, and means whereby said safety-resistance and shunt are simultaneously controlled, substantially as described.

16. The combination with a shunt-wound motor, of a reversing-switch controlling the direction of the current through the armature, a safety-resistance in the armature-circuit, a resistance in the field-magnet circuit, a shunt controlling said field-magnet circuit, and connections between the reversing-switch and safety-resistance and shunt whereby they are controlled from a single shaft, substantially as described.

17. The combination with motor, of a reversing-switch, a resistance in the field-magnet circuit, a shunt around the resistance, a contact controlling the shunt, and connections between the contact and reversing-switch whereby the shunt is controlled in accordance with the movements of the reversing-switch arm, substantially as described.

18. The combination with a shunt-motor, and as a means for overcoming the effects of the extra current, a reversing-switch, a non-inductive resistance in the field-magnet circuit, a shunt around the field-magnet circuit including a condenser, a shunt-circuit around the field-magnet resistance, and a contact controlling said shunt, the arrangement being such that when the reversing-switch is operated to make and break the circuit, the resistance and condenser are in the field-magnet circuit, substantially as described.

19. The combination with a shunt-wound motor, and as a means of preventing the effects of the extra current, of a reversing-switch having a series of resistances, a combined field and armature circuit leading from the switch in which the resistances may be included or excluded, an auxiliary safety-resistance in the armature-circuit, and a non-inductive resistance in the field-magnet circuit, means for controlling the resistance in the switch and in the branch circuits, arranged substantially as described, so that at the moment of starting and stopping the motor the switch-resistance shall be included in the combined circuits, and the resistances shall be included in the shunt-armature and field-magnet circuits respectively, substantially as set forth.

20. The combination with a shunt-motor, the field-magnet coils of which are in section, of a reversing-switch, a combined armature and field-magnet circuit leading from the switch and an auxiliary switch, the said auxiliary switch having two contacts for the field-magnet branch circuits, arranged so that one will be made or broken before the other, substantially as described.

21. The combination with a motor, of a reversing-switch including a series of resistances, operating mechanism for the switch, and devices for limiting the movement of said operating mechanism to a partial movement of the switch at each movement of the operating devices, substantially as described.

22. The combination with a motor, of a circuit controlling and reversing switch having a series of resistances, a switch-arm, a hand-lever connected to the arm, and devices for limiting the movement of the arm to a partial movement of the switch at each movement of the operating devices, substantially as described.

23. The combination with an elevator-cage, winding-drum, electric motor, and a switch controlling said motor, of a hand-lever on the cage, connections between the hand-lever and switch including devices for limiting the movement of the hand-lever so that it must be moved forward and back and forward again to complete the movement of the switch, substantially as described.

24. The combination with a motor, of a circuit controlling and reversing switch, a resistance in the field-magnet coils, a shunt around said resistance, means for controlling said shunt, a hand-lever for operating the switch and shunt controlling means, connections between the hand-lever and switch arranged so that at the first movement of the hand-lever the switch resistance will be included in the circuit, and the field-magnet resistance will be short-circuited, while a further movement of the hand-lever will cut out the switch-resistance, and allow the shunt of the field-magnet resistance to be broken, substantially as described.

25. The combination with the switch controlling the engine of an elevator, of a controlling device on the elevator, the said controlling device comprising a hand-lever, a pawl and ratchet-wheel, and connections between the ratchet-wheel and switch, substantially as described.

26. The combination with the switch controlling the motor of an elevator, of a controlling device on the elevator-car comprising a hand-lever, pawls mounted on the hand-lever, two ratchet-wheels, sheaves for controlling the switch, and connections between the ratchet-wheel, and sheaves whereby the latter may be operated at varying speeds on the movement of the hand-lever, substantially as described.

27. The combination with the elevator-cage and electric motor for operating it, a switch controlling the electric motor, of switch-controlling devices mounted on the elevator-cage, sheaves carried by the cage, ropes passing over the sheaves, and connected to the switch, a hand-lever carrying pawls, a ratchet-wheel having two sets of ratchets arranged in opposite directions, and connections between the ratchet-wheel and sheaves whereby the sheaves are operated step by step by the movement of the hand-lever, substantially as described.

28. The combination with an elevator-cage, electric motor, and switch controlling the motor, of a controlling device mounted on the cage having sheaves, ropes passing over the sheaves, and connected to the switch, a shaft supporting the sheaves carrying pinions, a shaft carrying pinions connected to said pinions, ratchet-wheels mounted on the shaft for operating the pinions, and a vibrating hand-lever having pawls engaging the ratchet-wheels, substantially as described.

29. The combination with the elevator-cage, an electric motor, and switch controlling the motor, ropes connected to the switch, sheaves carried by the cage over which the ropes pass, a counter-shaft, a hand-lever pivotally mounted on said counter-shaft, two ratchet-wheels carried by said counter-shaft, pinions between the ratchet-wheels and sheaves, and pawls on the hand-lever arranged to engage the ratchet-wheels, substantially as described.

In testimony whereof I have signed my name to this specification in the presence of two subscribing witnesses.

RUDOLPH C. SMITH.

Witnesses:
F. L. FREEMAN,
ALLE N. DOBSON.